United States Patent
Gartner

[11] Patent Number: 6,092,644
[45] Date of Patent: Jul. 25, 2000

[54] TRANSPORTING HANGER FOR A HANGING-TYPE CONVEYOR

[76] Inventor: Franz Gartner, Muhlweg 10, 97656 Oberelsbach, Germany

[21] Appl. No.: 09/082,228

[22] Filed: May 20, 1998

[30] Foreign Application Priority Data

May 21, 1997 [DE] Germany .......................... 297 08 967

[51] Int. Cl.[7] ................................................... B65G 17/32
[52] U.S. Cl. ................ 198/680; 198/320.01; 198/482.1; 198/486.1
[58] Field of Search ........................... 198/370.01, 482.1, 198/486.1, 680

[56] References Cited

U.S. PATENT DOCUMENTS

| | | | |
|---|---|---|---|
| 1,946,438 | 2/1934 | Drake et al. ........................ | 198/486.1 |
| 1,994,646 | 3/1935 | Heath ................................... | 198/482.1 |
| 3,402,675 | 9/1968 | Witt ...................................... | 198/680 |
| 3,547,714 | 12/1970 | Freeman ................................ | 198/680 |

*Primary Examiner*—Joseph E. Valenza
*Attorney, Agent, or Firm*—Goodman & Teitelbaum, Esqs.

[57] ABSTRACT

The invention relates to a transporting hanger for a hanging-type conveyor, in particular a circular conveyor, for conveying articles hanging on hooks (45), it being the case that the transporting hanger has a transporting hook (2) with a hook lug (6) which is oriented in the conveying direction (4) and is intended for receiving a hook (45), and there is provided an ejection lever (20) which is arranged on the transporting hanger (1) so as to pivot in the conveying direction (4), such that, upon pivoting, it removes the hook (45) from the hook lug (6) in the conveying direction (4).

27 Claims, 6 Drawing Sheets

TRANSPORTING HANGER FOR A HANGING-TYPE CONVEYOR

The invention relates to a transporting hanger for a hanging-type conveyor, preferably for a sorting hanging-type conveyor.

Such a transporting hanger for a hanging-type conveyor is known from DE 38 34 576 C2. The transporting hanger, which is referred to as a transporting gripper in said document, comprises a basic body which is rectangular in side view, has its longitudinal sides arranged vertically and, in the region of a top narrow side, is fitted on a rail of a circular conveyor by means of running rollers. A plurality of transporting hangers are fastened on a drawing means, which may be a chain or an elastic belt, the transporting hangers being arranged at regular intervals on the drawing means. The drawing means is driven in the conveying direction, it being the case that it carries along the transporting hangers rolling along the rail and conveys these in circulation in the circular conveyor.

At the bottom end region, the transporting hanger has a bottom narrow side, in which there is provided a recess which is open at the bottom. A pivot element is fastened pivotably on the transporting hanger. The pivot element has a hook finger which is oriented in the conveying direction, butts against the bottom narrow side of the rectangular basic body and closes off the recess. On the pivot element, a control roller is arranged on a basic-body region which projects counter to the conveying direction.

Provided along the rail of the circular conveyor are ejection stations, which have a cam on which an oblique control surface is formed. The cam can be pivoted into the running path of the control rollers by means of an actuating device. When the control wheel runs over the control surface of the cam, the hook finger is pivoted away downward, with the result that a hook which is fitted in a transporting-hanger recess formed by the finger hook drops downward.

Arranged in the region of the ejection stations, beneath the rail of the circular conveyor in each case, are branching rails, onto which the released hooks, with the articles hanging thereon, drop. The branching rails have a short receiving finger which is arranged parallel to the rail of the circular conveyor, is bent at its front end in the conveying direction and is connected to the rest of the branching rail in an articulated manner. The finger can be pivoted, by means of a finger-actuating device, into the running path of the article-carrying hooks, in order to receive a downwardly dropping hook.

This known hanging-type conveyor is used to eject the hooks at the individual ejection stations in accordance with predetermined sorting criteria, with the result that articles which are sorted in accordance with a predetermined criterion collect on the branching rail assigned to a specific ejection station in each case. This kind of hanging-type conveyor has proven successful for sorting articles hanging on hooks.

However, the inertia of the hooks and/or of the articles hanging thereon may result in the operation of the hooks being released from the transporting hangers taking different amounts of time—lightweight, large-surface-area articles are released very slowly from the pivoted-away, obliquely downwardly projecting hook finger; heavy, in particular small-surface-area articles drop down immediately onto the receiving finger of the branching rail—with the result that, at high conveying speeds, defined transfer, onto the branching rail, of articles hanging on hooks is not possible and it may be the case that delayed release of the article-carrying hooks from the transporting hanger results in incorrect ejection.

In addition, the article-carrying hooks freefall in an uncontrolled manner. A hook which is subject to oscillation about a vertical axis may strike a receiving finger by way of its free end, with the result that, rather than fitting into the receiving finger, it drops down laterally. This uncontrolled state constitutes a considerable disadvantage of this known sorting conveyor.

GB Patent 1 482 519 discloses a similar transporting finger with a hook finger which pivots away downward. The hook finger is mounted pivotably on the transporting hanger and is actuated by means of a separate control lever. Arranged in a laterally projecting manner on the control lever is a control roller, which can be deflected on an obliquely positioned control rail. In the case of this transporting hanger too the articles hanging on hooks are ejected onto a branching rail by dropping downward.

The object of the invention is to provide a transporting means with a transporting hanger for a hanging-type conveyor, preferably for a sorting hanging-type -conveyor, which allows articles hanging on hooks to be transported reliably and quickly and ejected in a defined manner. The installations are to be of uncomplicated construction and to comprise a small number of individual parts, in particular a small number of moveable individual parts for the ejection operation, and are to utilize hitherto unutilized space alongside the transporting path.

The object is achieved by a transporting hanger having the features of claim 1. Advantageous configurations are defined in the subclaims.

The invention is explained in more detail hereinbelow, by way of example, with reference to the drawing, in which.

Figure 1:
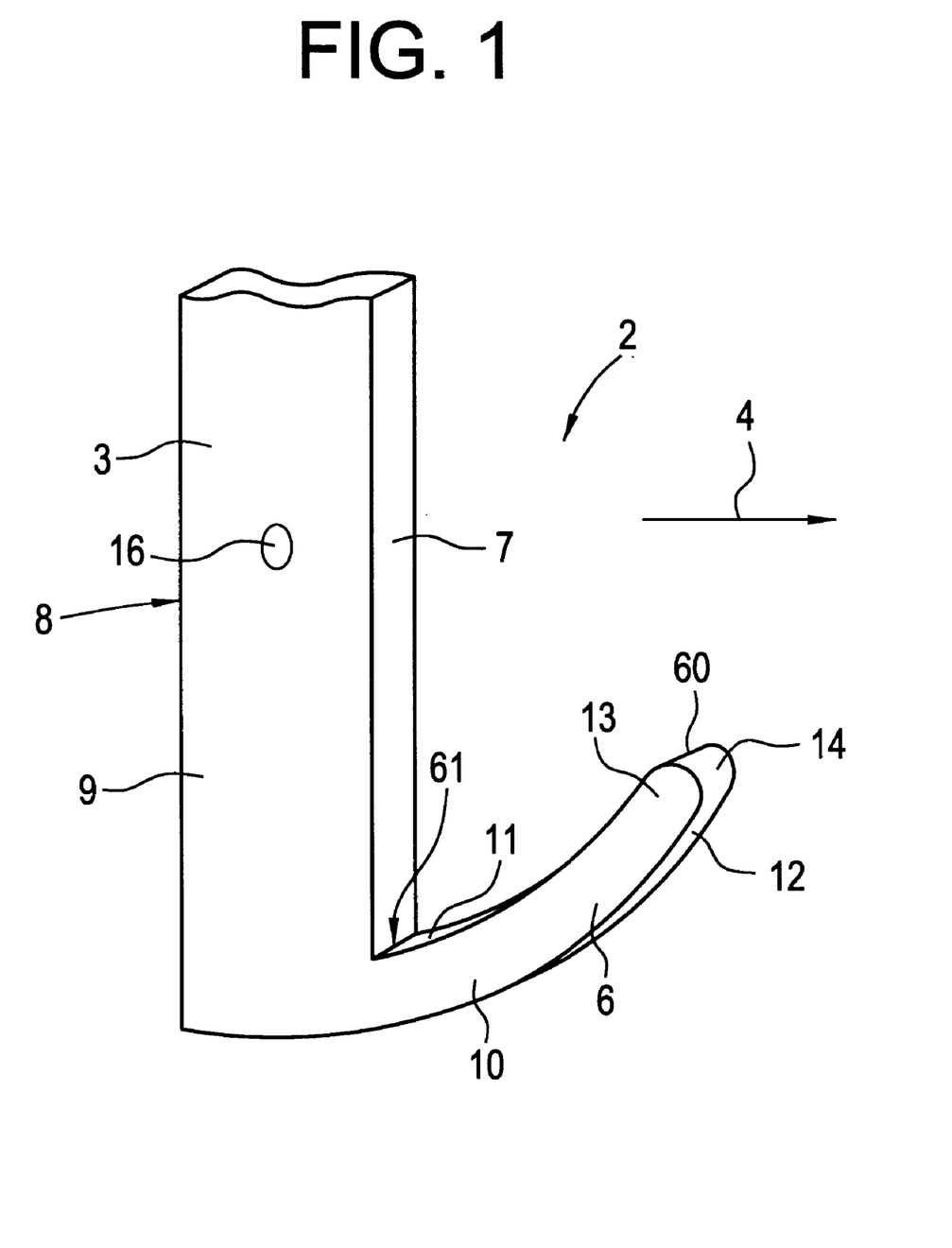
FIG. 1 shows a perspective view of a transporting hook of the transporting hanger according to the invention without its top end region.

The transporting hanger 1 according to the invention has a transporting hook 2. The transporting hook 2 comprises a cuboidal, vertically elongate basic body 3 and a hook lug 6 which projects in the conveying direction 4 at the bottom end of the basic body 3. The basic body 3 has a narrow end surface 7, 8, at the front and rear in the conveying direction 4, and two broad side surfaces 9. The hook lug 6 is directed upward, to the front in the conveying direction 4, from the bottom end of the basic body 3 and, overall, its length falls just short of an arc of a quarter-circle.

The hook lug 6 has two side surfaces 10, a top, supporting surface 11, which runs in the form of an arc of a circle, and a bottom surface 12, which preferably likewise runs in the form of an arc of a circle. At the free end 13, which is arranged so as to be located opposite the bottom end of the basic body 3, the hook lug 6 is designed with an end surface 14 which, in side view, is in the form of an arc of a circle or is rounded, and merges, above the hook lug 6, into the supporting surface 11 and, beneath the hook lug 6, into the bottom surface 12.

The transporting hook 2 has a top end region 15 (FIG. 5), which is designed, in a manner known per se, as a coupling element by means of which the transporting hook 2 can be fitted on, or coupled to, a drawing means of a circular conveyor.

Provided in the basic body 3, at a level above the free end of the hook lug 6, is a bore 16 or hole which passes through the basic body 3 horizontally between, and perpendicularly with respect to, the two side surfaces 9. The bore 16 is arranged in the center point of the circle arcs described by the supporting surface 11 and the bottom surface 12.

Figure 2:
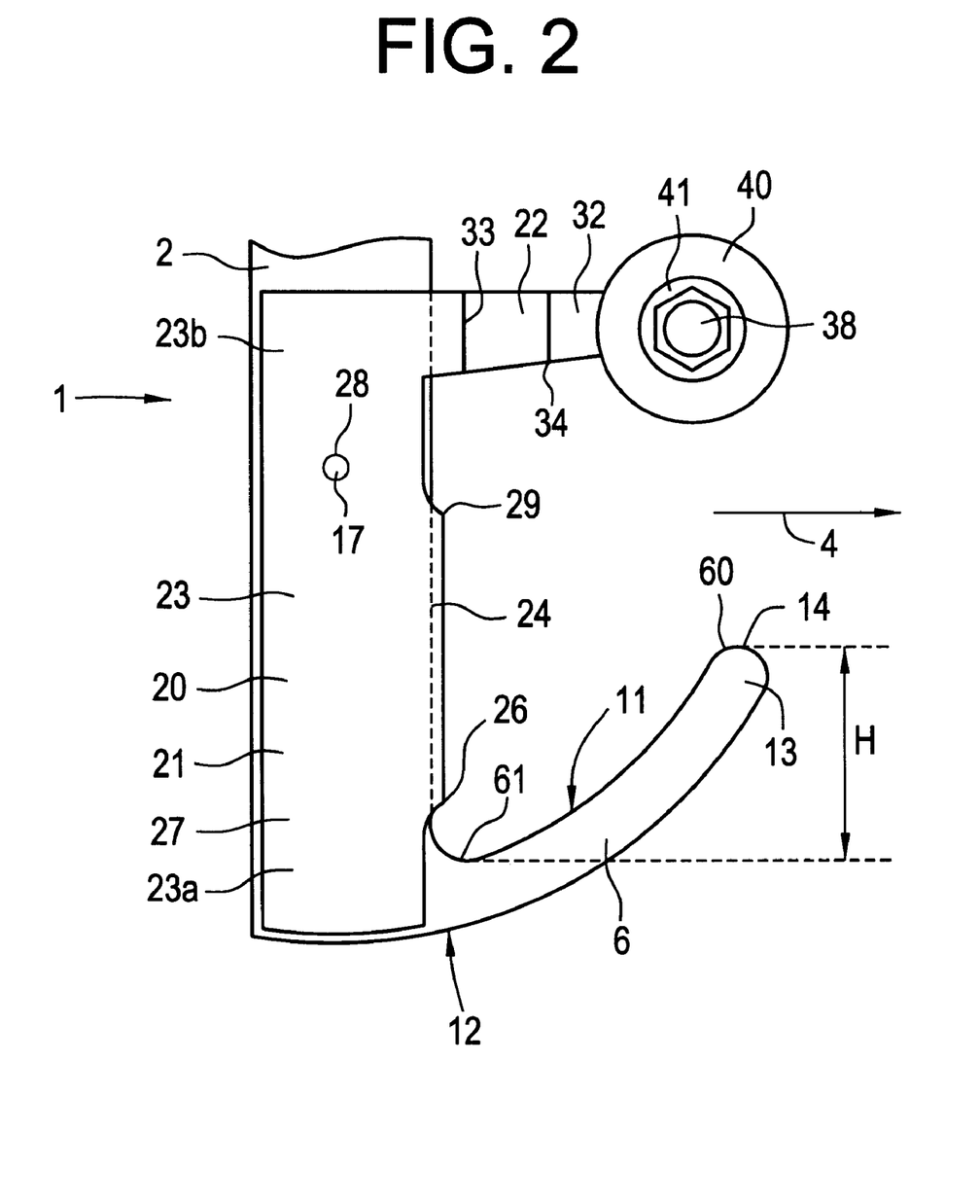
FIG. 2 shows a side view of a transporting hanger.
Figure 3:
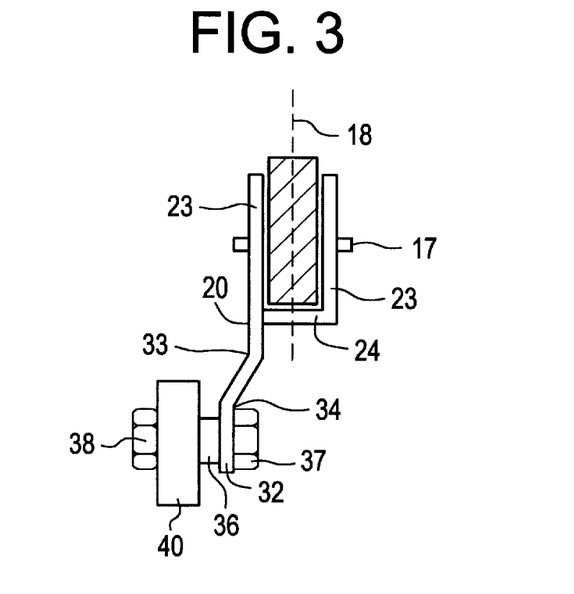
FIG. 3 shows the transporting hanger from FIG. 2 in cross-section as viewed in the downward direction and without a hook lug.

Mounted in the bore 16 is a pin 17, which, on both sides, projects beyond the side surfaces 9 of the basic body 3 (FIGS. 2, 3). The pin 17 is located perpendicularly with respect to a longitudinal center plane 18 of the transporting hook 2 of the transporting hanger 1 according to the invention.

An ejection lever 20 is mounted pivotably on the pin 17. The ejection lever 20 comprises a lever arm 21 and a control arm 22, which is angled away from said lever arm. The lever arm 21 engages around the transporting hook 27 and is a cross-sectionally essentially U-shaped sheet-metal part with two side walls 23, which are located opposite, and closely adjacent to, the side surfaces 9, and with a stop-type end wall 24, which is arranged on the front of the side walls 23 in the conveying direction 4, so as to strike against the front end surface 7. The side walls 23 extend downward, virtually as far as the bottom surface 12 of the hook lug 6, by way of side-wall end regions 23a. The end wall 24 terminates just above the supporting surface 11 of the hook lug 6 and has a bottom horizontal edge 26. The side-wall end regions 23a, which project downward beyond the edge 26, thus form a fork-like bottom end region 27 (FIG. 4), which engages around the bottom end region of the transporting hook 2 and the hook lug 6.

Figure 4:
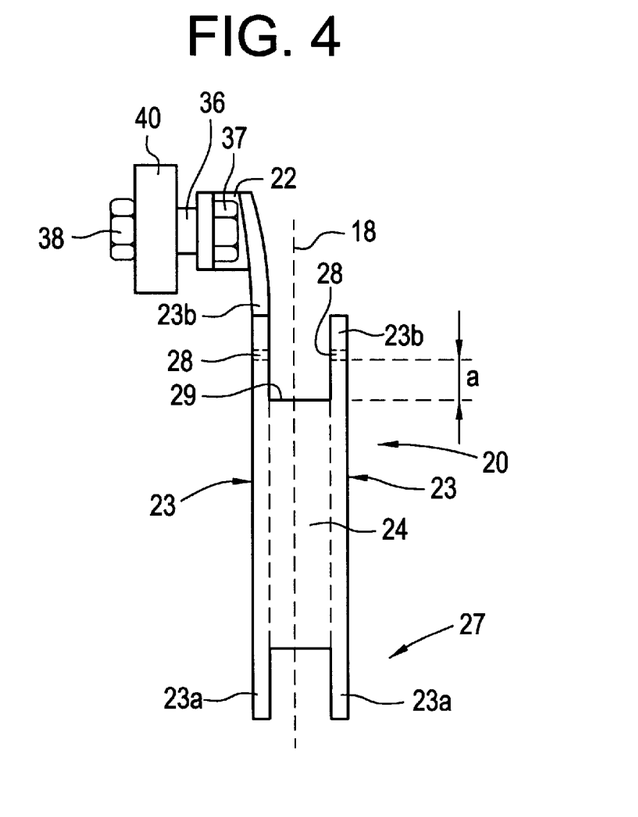
FIG. 4 shows a front view of an ejection lever.

In each case one hole 28 is provided in the top end regions 23b of the side walls 23, these holes being located opposite one another, in alignment, and having the pin 17 engaging through them. The end wall 24 has a top boundary edge 29, which is arranged at a distance a beneath the holes 28 (FIG. 4).

One of the two side walls 23 has a top end region 23b which is extended some way beyond the holes 28. The extended top end region 23b is bent outward and directed somewhat away from the longitudinal center plane 18 of the transporting hanger 1. The control arm 22 is attached to said extended top end region 23b approximately at right angles, so as to project in the conveying direction 4.

The control arm 22 has a free end region 32 (FIG. 3) which is arranged at the front in the conveying direction 4 and, by way of two bends 33, 34, is angled away from the center plane 18, the plane which defines the free end region 32 of the control arm 22 being arranged approximately parallel to the center plane 18.

A bearing bush 36, inserted onto a pin, is fastened at the free end region 32 by means of a screw-connection 37, 38. The bearing bush 36 is arranged perpendicularly with respect to the center plane 18 and on the opposite side of the control arm 22 from the center plane 18. A control roller 40 is mounted rotatably on the bearing bush 36 by means of a ball bearing 41. The roller arrangement forms an overweight with respect to the lever arrangement 21, 22, with the result that the lever arm 21 is held in abutment against the end surface 7 of the transporting hook 2 by way of its wall 24.

Figure 5:
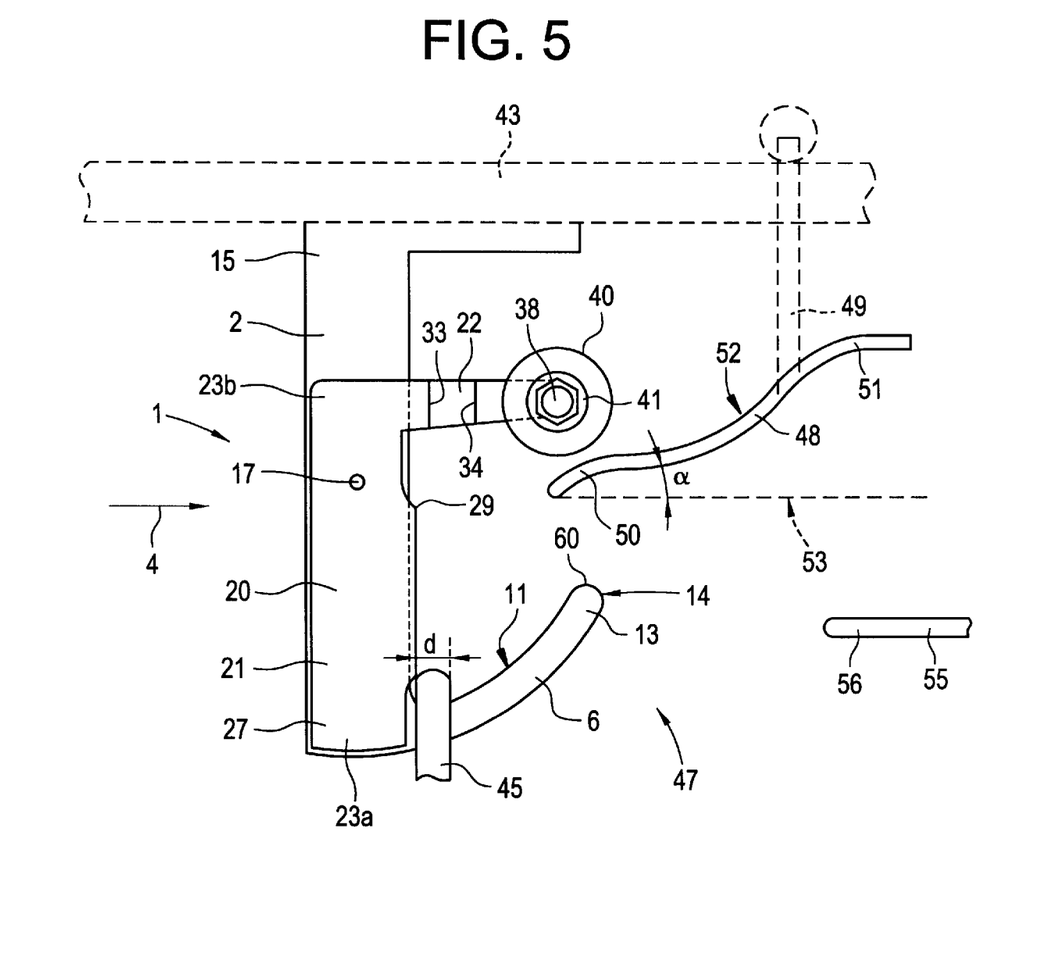
FIG. 5 shows the side view of the transporting hanger from FIG. 2 in the region of an ejection station.

The transporting hangers 1 according to the invention are used in a circular conveyor which is known per se and in which they are inserted into a rail 43, in a rigidly downwardly directed manner, by way of the top end region 15 of the transporting hook 2 and are driven continuously in the conveying direction 4 by an endless drawing means, for example a chain or a belt (FIG. 5).

The operation of loading the transporting hanger 1 with a hook 45 on which an article is hanging, e.g. with the hook of a clothes hanger on which an article of clothing which is to be sorted is hanging, takes place in a manner known per se in that, for example, a hook 45 is fitted onto a short rail element (not illustrated) with two parallel tracks which are arranged such that the transporting hanger 1 according to the invention moves through between the tracks by way of its transporting hook 2 and carries along the hook 45 with the article which is to be transported.

For the purpose of ejecting the hook 45 which is fitted on the transporting hangers 1, a plurality of ejection stations 47 are arranged along the rail 43. An ejection station 47 has in each case one control rail 48 which can be pivoted into the running path of the control roller 40 by means of an actuating device 49. In side view (FIGS. 5, 6), the control rail 48 runs essentially in the form of an S-shaped or slightly undulating curve with two long, flat wave crests 50, 51 and a wave trough 52 arranged therebetween. The control rail 48 is arranged with an upwardly sloping inclination in the conveying direction 4 in relation to a horizontal 53. The angle of inclination $\alpha$ is in the range from 10° to 40° and preferably in the range from 15°to 25°. The function of the control rail 48 will be described in more detail at a later stage in the text.

Figure 7:
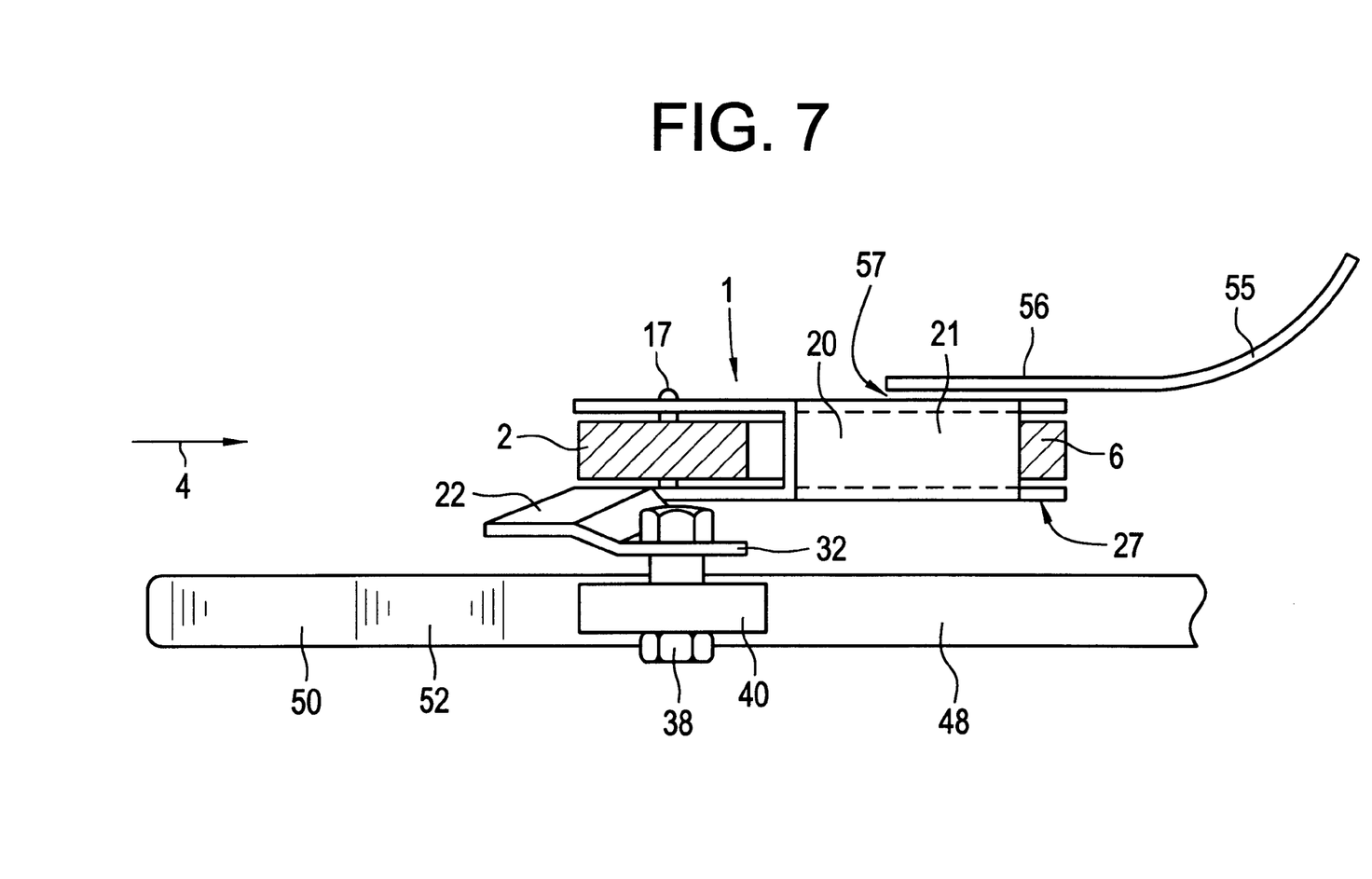
FIG. 7 shows the plan view of the transporting hanger depicted in FIG. 6, the ejection lever being pivoted out.

In each case one fixedly installed branching rail 55 is arranged at the ejection station 47. As a receiving finger 56, the branching rail 55 has a, for example, straight end region for receiving a hook 45. The receiving finger 56 is arranged, for example, parallel to the center plane 18 or so as to lead away laterally outward, in a horizontal or downwardly inclined manner, expediently level with the free end 13 of the hook lug 6. In each case, the receiving finger 56 is positioned at a higher point than the lowest point of the supporting surface 11 of the hook lug 6 and expediently at a lower point than the free end 60 of the hook lug 6, with the result that the finger 56 does not project into the movement path of the transporting hanger 1 together with the hook 45. The receiving finger 56 is oriented with its free end counter to the conveying direction 4 and is arranged such that, when a transporting hanger 1 moves past, there is only a narrow gap 57 between the receiving finger 56 and the transporting hanger 1 (FIG. 7).

Following on from the receiving finger 56, the branching rail 55 is bent away outward, and slopes steeply, from that plane, parallel to the center plane 18, in which the front end of the finger 56 is located.

Figure 6:
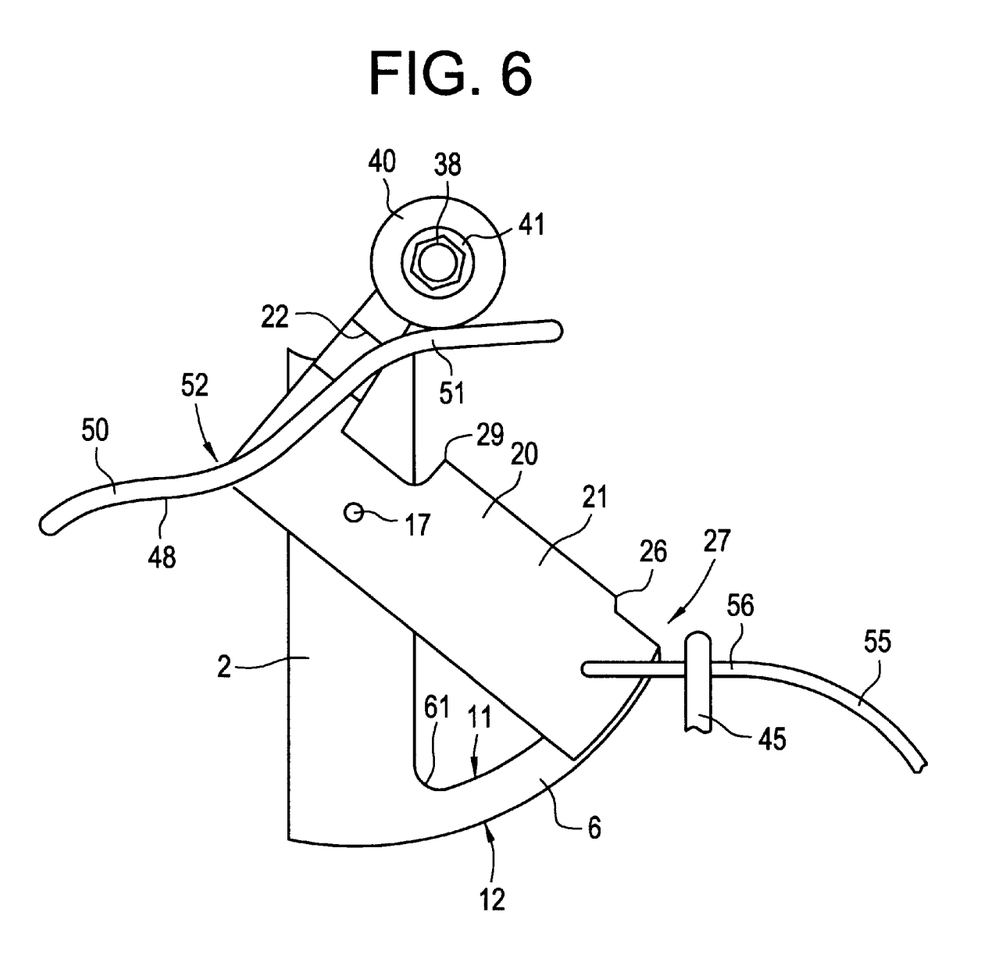
FIG. 6 shows the side view of the transporting hanger with the ejection lever pivoted out.

In order to eject a hook 45, the control rail 48 is pivoted into the running path of the control roller 40 by means of the actuating device 49. A transporting hanger 1 loaded with a hook 45 is moved along the rail 43, in the conveying direction 4, toward the ejection station 47. In the region of the bottom wave crest 50, the control roller 40 strikes against the control rail 48. The control roller 40 rolls along the control rail 48 by way of the wave trough 52 and the top wave crest 51. When the control roller 40 rolls out of the wave trough 52 onto the wave crest 51, the control roller 40 is raised, as a result of which the ejection lever 20 is pivoted about the pin 17, counter to the conveying direction 4. In this case, the control arm 22 is moved upward and the lever arm 21 has its bottom end region 27 moved upward and forwards in the conveying direction 4 (FIGS. 5, 6). A clothes-hanger hook 45 which is hanging on the transporting hook 2 is pushed upward on the hook lug 6, in the conveying direction 4, toward the free end 13 of the hook lug 6 by means of the forked, bottom end region 27 of the lever arm 21. The hook 45 slides upward along the hook lug 6 and, in accordance with the slope of the steep transition region of the control rail 48, is moved between the wave trough 52 and the top wane crest 51. This movement can even turn into a free throwing-type movement. At the same time, the transporting hanger 1 passes the receiving finger 56. Since the hook 45 has been raised upward, the receiving finger 56 can engage laterally in the hook-shaped region of the hook 45. As the hook 45 continues to run onto the finger 56, the hook 45 slides further on the receiving finger 56 until it reaches the steeply sloping branching rail 55, along which it slides downward toward the ejection station. The finger 56 and the branching rail 55 are arranged such that the hook 45 with the article is drawn away laterally from the transporting means. At the receiving point between the free end 13 of the hook lug 6 and the free end of the finger 56, the hook 45 is expediently pushed some way from the hook lug 6; accordingly, these parts are positioned in relation to one another.

If a transporting hanger 1 according to the invention is to pass the ejection station 47 without ejecting a hook 45, then all that happens is that the control rail 48 is pivoted out of the running path of the control roller 40. The ejection lever 20 is not actuated as the transporting hanger passes the ejection station 47, and the hook 45 remains in the lower-most region of the hook lug 6, with the result that it passes beneath the receiving finger 56, arranged level with the free end 13 of the hook lug 6, on the branching rail 55. It is thus not necessary, in the case of the sorting hanging-type conveyor according to the invention, for the receiving finger 56 to be pivoted, by means of an adjusting device, between a position in which it receives hooks 45 and a position in which it does not receive any hooks 45. As soon as the roller 40 has passed over an activated control rail 48, it drops downward, as a result of its weight, and pivots the lever arms 21, 22 into their initial position again.

An ejection movement which is accelerated as a result of the slope of the control rail 48 causes tale hook 45 to be pushed onto the branching rail 55 and to slide along the branching rail 55. In this case, it can be raised further by the trailing transporting hook, which is now empty, until it slides away laterally in the downward direction and is thus moved away from the transporting hanger 1. The hooks 45 are actively raised out of the transporting hook 2 in a controlled manner by the lever arm 21, by way of a pushing-out action, with the result that any risk of a transporting hanger 1 and a hook 45 catching during the ejection operation is ruled out. The transporting hangers according to the invention thus ensure that articles hanging on hooks are ejected reliably. The ejection operation can take place at a high transporting speed since, rather than freefalling, the hooks 45 which are to be ejected are transferred in a mechanically guided manner directly onto the branching rail 55 from the hook lug 6 of the transporting hanger 1.

In the case of the sorting hanging-type conveyor according to the invention, the branching rails 55 may be arranged both to the right and to the left of the sorting hanger 1 in the conveying direction. The branching rails are preferably arranged such that they engage in the closed part of the hook 45, i.e. in that sub-region of the hook 45 which merges into the hook stem connected to the clothes hanger.

The abovedescribed exemplary embodiment of the sorting hanger has a single control arm 22. It is similarly possible for in each case one control arm with a control roller 40 to be provided on both sides of the ejection lever 22, with the result that a control rail 48 can be pivoted into the running path of one of the two control rollers 40 from both sides of the transporting rail 43.

In order to achieve accelerated ejection of the hook 45, it is not necessary for the hook lug 6 to run upward in the form of an arc of a circle in the conveying direction 4. It is also possible for the hook lug 6 to be designed with some other degree of curvature, e.g. shallower or steeper curvature, or with a straight, upwardly oriented supporting surface 11.

However, the circle-arc curvature of the hook lug 6 of the exemplary embodiment constitutes a preferred embodiment, in which the top culmination point 60 of the front end surface 14 of the hook lug 6 is arranged at a point, above the lowermost point 61 of the supporting surface 11, which is approximately 3 to 4 times higher than the thickness d of a wire from which the bent hooks 45 are usually produced, with the result that a hook 45 which is fitted on the transporting hook 2 can pass beneath a receiving finger 56 with sufficient play and, upon ejection of the hook 45, the latter is raised onto the receiving finger 56 via the top culmination point 60 of the front end surface 14. The difference in height H between the culmination point 60 and the lowest point 61 of the supporting surface 11 is in the range from 1.0 cm to 3 cm and preferably in the range from 1.5 cm to 2.5 cm.

In addition, there is no friction-producing relative movement between the hook 45 and the lever arm 21.

It is also possible for the transporting hook 2 to be, for example, of round or oval shape in cross-section. The configuration of the ejection lever may likewise be different. The essential factor is its function of raising the clothes-hanger hook 45 upward in the conveying direction.

What is claimed is:

1. A transporting hanger for a hanging-type conveyor, in particular a circular conveyor, for conveying articles hanging on hooks (45), the transporting hanger comprising:

a transporting hook (2) provided with a hook lug (6), the hook lug (6) being oriented in a conveying direction (4) for receiving a hook (45), an ejection lever (20) is arranged on the transporting hanger (1) so as to pivot in the conveying direction (4), so that, upon pivoting, the ejection lever (20) removes the hook (45) from the hook lug (6) in the conveying direction (4), the ejection lever (20) including a lever arm (21) and a control arm (22), the lever arm (21) having a stop wall (24) striking against the transporting hook (2), the control arm (22) being arranged at an angle to the lever arm (21) to provide an angle arrangement therebetween, and the ejection lever (20) being overweight to coact with the angle arrangement of the control arm (22) so that the ejection lever (20) is held in abutment against the transporting hook (2).

2. The transporting hanger as claimed in claim 1, wherein the hook lug (6) is sloped upward in the conveying direction (4).

3. The transporting hanger as claimed in claim 1, wherein the hook lug (6) is sloped upward in the form of an arc in the conveying direction.

4. The transporting hanger as claimed in claim 3, wherein the hook lug (6) is sloped upward in the form of an arc of a circle.

5. The transporting hanger as claimed in claim 1, wherein the hook lug (6) is sloped straight upward at an angle.

6. The transporting hanger as claimed in claim 1, wherein the transporting hook (2) comprises a vertically elongate basic body (3) and the hook lug (6), which is arranged at the bottom end of the basic body (3).

7. The transporting hanger as claimed in claim 6, wherein the basic body (3) has a cuboidal structure.

8. The transporting hanger as claimed in claim 7, wherein the basic body (3) has a narrow end surface (7, 8) at the front and rear in the conveying direction (4), and two broad side surfaces (9), and the hook lug (6) has two side surfaces (10), a top, supporting surface (11) and a bottom surface (12) as well as an end surface (14) which, in side view, is in the form of an arc, in the form of an arc of a circle or is sloped straight upward at an angle in relation to the longitudinal extent of the basic body (3), and merges, above the hook lug (6), into the supporting surface (11) and, beneath the hook lug (6), into the bottom surface (12).

9. The transporting hanger as claimed in claim 7, wherein a difference in height (H) between the lowest point (61) of the supporting surface (11) and a top culmination point (60) of the end surface (14) is in the range from 1 cm to 3 cm and preferably in the range from 1.5 to 2.5 cm.

10. The transporting hanger as claimed in claim 1, wherein, the control arm (22) is formed on the ejection lever (20) so as to be oriented toward the front in the conveying direction (4).

11. The transporting hanger as claimed in claim 1, wherein the control arm (22) is arranged at right angles to the lever arm (21).

12. The transporting hanger as claimed in claim 1, wherein the lever arm (21) is a sheet-metal part with the stop wall (24) arranged on a front of side walls (23) in the conveying direction (4).

13. The transporting hanger as claimed in claim 1, wherein the lever arm (21) is a cross-sectionally U-shaped sheet-metal part with two side walls (23) and with the stop wall (24), which is arranged on a front of the side walls (23) in the conveying direction (4).

14. The transporting hanger as claimed in claim 12, wherein the side walls (23) extend downward, virtually as far as a bottom surface (12) of the hook lug (6), by way of side-wall end regions (23a), and the stop wall (24) terminates just above a supporting surface (11) of the hook lug (6) and has a bottom horizontal edge (26), with the result that the lever arm (21) terminates in the form of a fork which engages over the hook lug (6).

15. The transporting hanger as claimed in claim 1, wherein the ejection lever (20) is mounted pivotably on a pin (17) which engages horizontally through the transporting hook (2).

16. The transporting hanger as claimed in claim 15, wherein the pin (17) is arranged on the transporting hook (2) in a center point of a circle which determines a circle arc for the hook lug (6).

17. The transporting hanger as claimed in claim 15, wherein the control arm (22) is attached to the lever arm (21) above the pin (17) and has a free end region (32) which is extends outwardly in the conveying direction (4) and, by way of two bends (33, 34), is angled away from a center plane (18) of the transporting hanger (1), the plane which defines the free end region (32) of the control arm (22) being arranged approximately parallel to the center plane (18).

18. The transporting hanger as claimed in claim 17, wherein arranged at the free end region (32) of the control arm (22), on the opposite side from the center plane (18), is a bearing bush (36) which is aligned perpendicularly with respect to the center plane (18), a control roller (40) being mounted rotatably on the bearing bush (36).

19. The transporting hanger as claimed in claim 12, wherein the control roller (40) is mounted on the bearing bush (36) by means of a ball bearing (41).

20. A sorting hanging-type conveyor for sorting articles hanging on hooks, in particular a circular conveyor, comprising:

a rail (43) along which transporting hangers (1) are guided in circulation;

at least one or more ejection stations (47) being arranged on the rail (43);

at least one of the transporting hangers (1) including a transporting hook (2) provided with a hook lug (6), the hook lug (6) being oriented in a conveying direction (4) for receiving a hook (45);

an ejection lever (20) is arranged on the transorting hanger (1) so as to pivot in the conveying direction (4), so that, upon pivoting, the ejection lever (20) removes the hook (45) from the hook lug (6) in the conveying direction (4);

the ejection lever (20) including a lever arm (21) and a control arm (22), the lever arm (21) having a stop wall (24) striking against the transporting hook (2);

the control arm (22) being arranged at an angle to the lever arm (21) to provide an angle arrangment therebetween; and the ejection lever (20) being overweight to coact with the angle arrangement of the control arm (22) so that the ejection lever (20) is held in abutment against the transporting hook (2).

21. The sorting hanging-type conveyor as claimed in claim 20, wherein said at least one ejection station (47) has a control rail (48) which can be pivoted into running path of control rollers (40) of the transporting hangers (1) by means of an actuating device (49).

22. The sorting hanging-type conveyor as claimed in claim 19, wherein, in side view, the control rail (48) runs in the form of an undulating or S-shaped curve with two long, flat wave crests (50, 51) and a wave trough (52) arranged therebetween.

23. The sorting hanging-type conveyor as claimed in claim 21, wherein the control rail (48) is arranged with an upwardly sloping inclination in the conveying direction (4) in relation to a horizontal (53), the angle of inclination preferably being in the range from 10° to 40° and, in particular, in the range from 15° up to 25°.

24. The sorting hanging-type conveyor as claimed in claim 20, wherein in each case one branching rail (55) is arranged at each ejection station (47), said branching rail (55) being arranged, by way of a receiving finger (56), approximately level with a free end (13) of the hook lug (6) of the transporting hanger (1).

25. The sorting hanging-type conveyor as claimed in claim 24, wherein the receiving finger (56) is arranged such that, as the transporting hanger (1) passes, there is only a narrow gap (57) between the receiving finger (56) and the transporting hanger (1).

26. The sorting hanging-type conveyor as claimed in claim 25, wherein the receiving finger (56) is straight and is aligned horizontally parallel to a center plane (18) of the transporting hook (2).

27. The sorting hanging-type conveyor as claimed in claim 26, wherein, in the region which leads away from the receiving finger (56), the branching rail (55) bends away from the center plane (18) and slopes steeply.

* * * * *